United States Patent [19]
Whittaker et al.

[11] Patent Number: 5,537,609
[45] Date of Patent: Jul. 16, 1996

[54] MINI CACHE OPERATIONAL MODULE FOR ENHANCEMENT TO GENERAL CACHE

[75] Inventors: Bruce E. Whittaker; Leland E. Watson, both of Mission Viejo, Calif.

[73] Assignee: Unisys Corporation, Blue Bell, Pa.

[21] Appl. No.: 547,260

[22] Filed: Oct. 24, 1995

Related U.S. Application Data

[63] Continuation of Ser. No. 80,861, Jun. 22, 1993, abandoned.
[51] Int. Cl.$^6$ ................................................. G11C 19/00
[52] U.S. Cl. ...................... 395/800; 395/446; 364/243.44; 364/245.31; 364/DIG. 1
[58] Field of Search ......................... 395/800, 446; 364/243.44, 245.31, DIG. 1

[56] References Cited

U.S. PATENT DOCUMENTS

| | | | |
|---|---|---|---|
| 3,970,999 | 7/1976 | Elward | 395/400 |
| 4,386,399 | 5/1983 | Rasala et al. | 395/375 |
| 4,731,738 | 3/1988 | Fisher et al. | 395/425 |
| 5,117,395 | 5/1992 | Hashimoto | 365/221 |
| 5,305,446 | 4/1994 | Leach et al. | 395/425 |
| 5,329,630 | 7/1994 | Baldwin | 395/425 |
| 5,357,621 | 10/1994 | Cox | 395/400 |

Primary Examiner—Alyssa H. Bowler
Assistant Examiner—John Harrity
Attorney, Agent, or Firm—Alfred W. Kozak; Mark T. Starr; Robert R. Axenfeld

[57] ABSTRACT

A mini-cache module is added to a computer system to increase throughput or may also be added to enhance the functionality of a general cache memory unit. The mini-cache module refills and stores frequently used data words concurrently during processor operations and provides them to the processor, eliminating the need to access a system bus to main memory. A data queue storage stores a data block of words from main memory and makes them available to requests from the main processor (if the requested address matches an address register block in the mini-cache). If an address "hit" occurs, then the mini-cache will prevent any system bus request to main memory and additionally will monitor the system bus for any "Write" operations which might feasibly change the validity of data in the data storage block of the mini-cache. In this case the data stored in the mini-cache is invalidated and cannot be used by the processor.

8 Claims, 7 Drawing Sheets (MINI-CACHE WITH NORMAL CACHE)

(MINI-CACHE WITHOUT NORMAL CACHE)

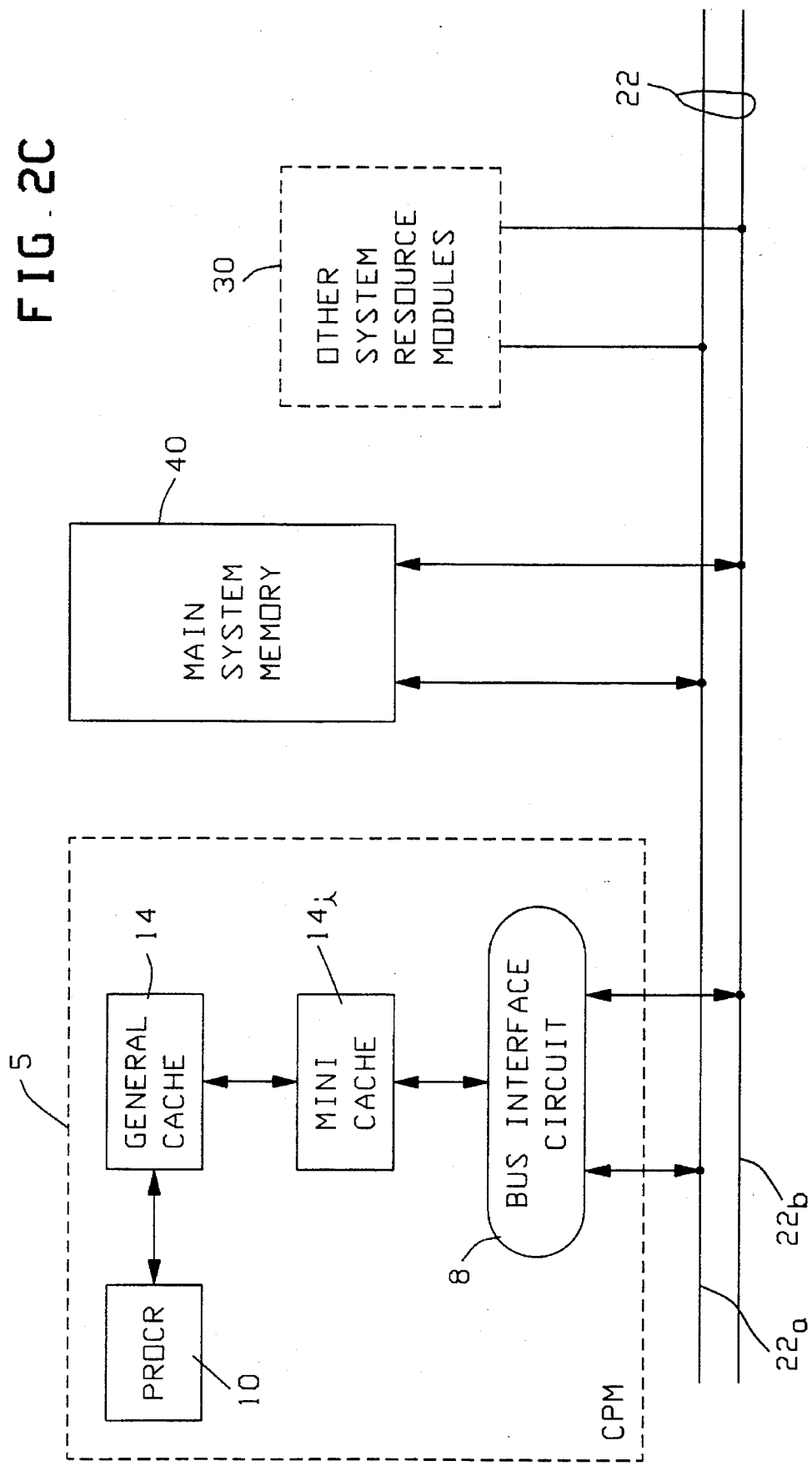

5,537,609

MINI CACHE OPERATIONAL MODULE FOR ENHANCEMENT TO GENERAL CACHE

This is a continuation of application Ser. No. 08/080,861 filed on Jun. 22, 1993, abandoned.

FIELD OF THE INVENTION

This disclosure relates to circuitry units for supplying cache memory or expanding general cache memory for a processor.

CROSS REFERENCES TO RELATED APPLICATIONS

This application is generally related to the type of computer systems described in a co-pending application U.S. Ser. No. 08/019,003 entitled "Synchronous Dual Bus System for Store-Through and Non-Store-Through Cache Memories in Multi Processor Networks". It is also related to a co-pending application U.S. Ser. No. 08/081,048, filed Jun. 22, 1993 and entitled "Enhanced Computer Operational System Using Auxiliary Mini-Cache."

BACKGROUND OF THE INVENTION:

As seen in FIG. 5 there is shown the basic diagram of a central processing module 5 having a processor 10 which interfaces with a system memory module 40 by means of a system bus 22. Other system modules 30 may share the system bus and these may include not only additional central processing modules, but also input/output processors and a maintenance subsystem. Additionally there can be a second identical system bus 22, which is used to increase the system bandpass as shown in the dotted bus lines of FIG. 5. This type of system is typical to that of the Unisys A-11 computer system described in the aforementioned U.S. Ser. No. 08/019,003 entitled "Synchronous Dual Bus System for Store-Through and Non-Store-Through Cache Memories in Multi Processor Networks".

Each of the features to be described herein would apply equally to a single bus system or a dual bus system. In a dual bus system, the accessing modules described herein would be able to access either bus as that bus is available. However, for simplicity of discussion, the following disclosure will view the situation of a single bus situation.

Typical of the Unisys A-11 system is a "E-Mode" designated protocol which transfers data on the basis of blocks of four related data words. For example, each word may be a word of 60-bits wherein 52 bits are information data, 7-bits are parity data and 1-bit indicates data corruption.

In a typical situation with a mix of typical system operating software, the processor 10 of FIG. 5 may, on the average, function to require memory accesses about every five clock times of processor operations, that is to say, the processor will execute processing operations for five clocks, then access memory, then process operations for five clocks and then access memory on an average basis. During the "memory access" times, the processor 10 must, of course, wait until the memory function in the main system memory 40 has provided the next data word or the next instruction code word before the processor can proceed with continuing its processing operations.

One recurring problem in digital system design is how to speed up throughput and reduce delaying processor access to memory data and instructions. FIG. 6 is a drawing which indicates the "processor/access cycle" time which is designated as $T_{ap}$. This time period $T_{ap}$ is made up of the processing time, $t_p$, plus the access time, $t_a$.

The performance of the system, of course, is dependent on the best speed of access to memory data and thus is an "inverse function" of the processor/access time, $T_{ap}$. Thus if this time period, or either of its sub-elements $t_p$, or $t_a$ can be reduced, then the system performance can be increased accordingly.

The presently described auxiliary mini-cache module provides a throughput enhancement system with methods and architecture for reducing the average memory access time, $t_a$. It may be noted that the access time may involve several elements which include:

(i) the time for bus arbitration and access grant required;

(ii) the system bus protocols used; and, (iii) the memory module 40 Read cycle time.

The memory module Read-cycle time, item (iii), is the most significant element and is the focus of the presently described system.

One technique to reduce the memory cycle time is the standard technique of using a general cache memory module 14 as seen in FIG. 4. Thus, as seen in FIG. 4, there is provided the insertion of a general cache memory module 14 between the central processing module with its processor 10 and the system bus 22 which provides a channel to and from the main memory 40.

A cache memory module such as the general cache 14 of FIG. 4 is made up of a very high speed fast memory cycle, fast data access cycle of operation but it also involves very expensive types of storage units such as RAMs.

The size of the cache units such as cache memory 14 is generally much smaller in addressability than the main system memory 40. However, since processing most often is sequential or repetitive in nature, the algorithms for cache designs have already been derived for filling the cache memory with data words that the processor 10 is most "likely" to need on its next operation or within the next few operations.

The "access time" between the processor 10 and the cache memory 14 is much faster than that which would be required to access main memory. Often, cache cycles are as quick as a single clock time period.

By using the appropriate cache hardware design algorithms, appropriate cache structure and cache size, the average "cache hit" rates may be as high as 80% to 90%, that is to say, that 80% to 90% of the time, the cache memory 14 already contains the data word which is needed by the processor 10.

FIG. 4 shows a generalized system where a central processing module 5 having a processor 10 communicates through an internal bus 12 to a general cache memory 14 which provides communication on a system bus 22 to the main system memory 40. This is a typically used system in order to enhance the data access time for the processor which will enhance throughput of the system.

FIG. 5 shows a generalized system diagram where a central processing module 5 having a processor 10 can communicate over a system bus 22 to the main system memory 40. Additionally, other system modules such as input/output modules, other central processing modules, and other digital units designated by the block 30 may also communicate over the system bus to access main memory. Thus at times, there will be contention for main memory between the processor 10 and the other system modules 30. Further, if one of the other system modules 30 is writing data on the system bus into main memory, then it is possible that the data in a cache memory unit could be invalid and not usable by the processor 10 in certain situations. Thus the presently described mini-cache has an Invalidation Block unit which prevents the processor from accessing data in the mini-cache when it is discovered that the system bus is writing new data into the main system memory 40. This will later be described in connection with the mini-cache of FIG. 1.

While better system performance value is seen from the addition of a cache memory module such as cache memory 14, it should be indicated that this gain comes at a considerable system cost in money and hardware and PC board real estate. Thus it is possible also to eliminate the general cache and substitute a less costly mini-cache in certain instances.

The presently described mini-cache module enhances the processor function to provide a considerable improvement in access time and throughput by use of the described mini-cache alone or the mini-cache in combination with a general cache memory unit.

SUMMARY OF THE INVENTION

A mini-cache module is provided for use of a processor in its requests for data or to enhance the data in a general cache memory. The mini-cache unit is added to a computer system architecture to interface between the processor and main memory or to interface between a general cache memory and the system main memory.

The mini-cache provides a Data Queue Block which holds a frequently used (or the most likely used) block of data words required by the processor. An Address Register Block holds the address values of each of the data words in the Data Queue Block. A Hit Control Block compares the processor's data address requests with those in the mini-cache and if a "hit" occurs, will cause a Queue Steering Block to select the appropriate data in a data register and transfer it immediately to the processor. An Invalidation Block Module monitors the system bus for memory type operations that may be in progress and if an address value held, in the mini-cache Address Register, is the same as the address value on the system bus, then the Invalidation Block will mark the mini-cache address value as invalid since possibly new Write data may be in progress to change the validity of the data in the Data Queue Block which was derived from the main memory module which is now undergoing change.

Absent the invalidation situation, the Hit Control Block will prevent execution of any system bus request to main memory in order that the data residing in the mini-cache can be immediately provided to the processor. Additionally, the mini-cache provides a Maintenance Block which is used to configure modes of operation for the mini-cache in order to differentiate between information data and instruction code data or whether the mini-cache is to be enabled or disabled.

BRIEF DESCRIPTION OF THE DRAWINGS

FIG. 2C is a generalized block diagram of a computer system with its processor having a general cache and an auxiliary mini-cache;

DESCRIPTION OF PREFERRED EMBODIMENT

Figure 1:
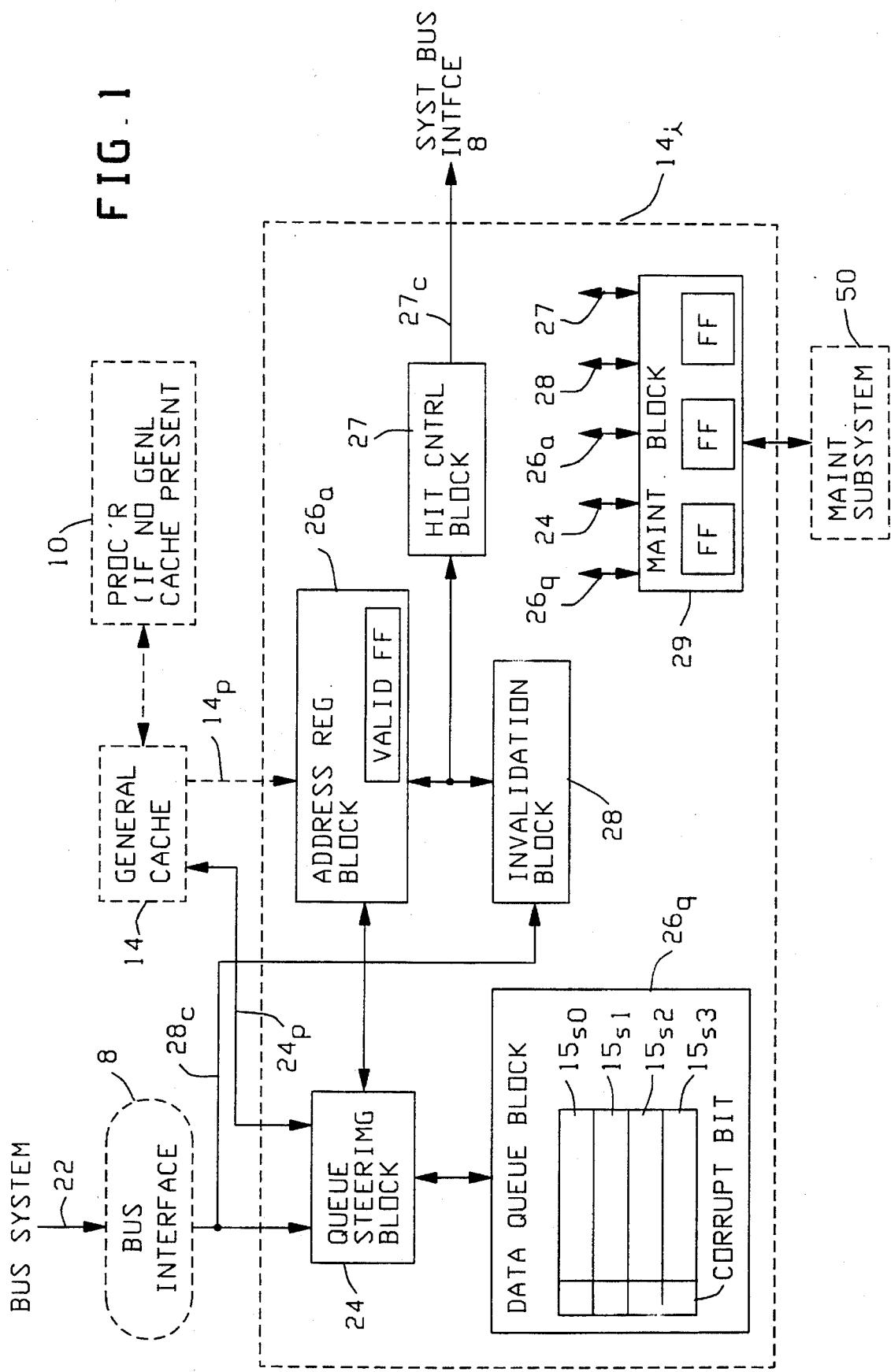
FIG. 1 is a block diagram of the auxiliary mini-cache module.

FIG. 2C shows a diagram of an enhanced computer system where a central processing module 5 holds a processor 10 having a general cache memory 14. Communicating with the general cache 14 is an auxiliary mini-cache $14_i$ which supports the general cache and which operates through a bus interface circuit 8 (FIG. 2C) to a system bus means 22. The system bus means may operate as a single bus channel or as dual busses $22_a$, $22_b$. Attached to the system bus means 22 is the main system memory 40 and a resource module block 30 which represents other modules on the system bus, such as peripheral controllers, other processors, I/O subsystem or other digital modules.

FIG. 1 shows a block diagram of the functional elements of the presently described mini-cache system architecture. The mini-cache $14_i$ shown in FIGS. 1 and 2C is seen to have an input from the system bus 22 which can be connected to main memory and/or other units such as I/O subsystem 30 (FIG. 2C). Additionally, the output from the mini-cache is seen to be presented to the processor 10 (FIG. 1).

The mini-cache $14_i$ operates in a system which provides a number of modules developing different functions. FIG. 1 shows the various functional blocks as the Queue Steering Block 24, the Data Queue block $26_q$, the Address Register block 26a, the Hit Control Block 27, the Invalidation Block 28, and the Maintenance Block 29.

The Queue Steering Block 24 receives data blocks from memory via bus interface 8 from the system bus 22. Steering Block 24 also routes the data block to general cache 14 or processor 10 directly, if no general cache is used. The Steering Block 24 also provides bidirectional connection with Data Queue Block $26_q$.

If the mini-cache structure were not present or if the mini-cache were disabled by the maintenance subsystem 50, then the processor 10 and the general cache memory 14 would connect directly to the system bus through a system bus interface. This interface would be typical to that described in U.S. Pat. No. 5,404,462 entitled "Dual Bus Interface Transfer System for Central Processing Module". On the other hand, if the mini-cache unit $14_i$ is present and enabled, then the mini-cache will interface to the system bus interface circuitry 8.

Referring to FIG. 1, the basic logical blocks which provide the functions for the mini-cache $14_i$ are shown in block diagram form. The Data Queue Block $26_q$ is seen to contain four identical 60-bit registers. These registers ($15_{sx}$) are designated as $15_{s0}$, $15_{s1}$, $15_{s2}$, and $15_{s3}$. Each of these registers can carry 60 bits of which there are 52 bits of data, 7 bits of parity upon the data and 1 bit indicating whether or not that particular data word is "corrupted" that is to say no longer usable because of errors or invalidation.

The Data Queue Block $26_q$ and the Queue Steering Block 24 are present in the chip logic whether the mini-cache $14_i$ is used or not. Thus the mini-cache function comes virtually free of additive circuitry.

The Queue Steering Block 24 works to direct which one of the four data queue registers $15_{xx}$ is to be loaded with data from the system bus 22. This block 24 also steers the output of the appropriate register 15 over to the processor 10.

The Address Register Block $26_a$ is circuitry which is loaded with the current processor memory address in order to hold this particular address value either until a new address is loaded or until the mini-cache address is invalidated.

The Hit Control Block 27 is used to monitor the processor's data address request and to compare this with the currently held address values in the Address Register block $26_a$. If a true comparison or "match" occurs and if the chosen Data Queue Register 15 is not marked as "corrupted", then the hit control block 27 will specify that a mini-cache "hit" has occurred. This will cause the Queue Steering Block 24 to select the appropriate data register from the data queue block $26_q$ and transfer this data immediately to the processor 10. Additionally, the hit control block 27 acts during the "hit" indication to prevent the system bus interface circuitry 8 (FIG. 2C) from initiating a system bus memory operation.

The "corrupt bits" in the Data Queue $26q$ are associated as one bit position for each one of the four words stored. The corrupt bit is set from either one of two sources: (i) if, while filling the Data Queue via the system bus from Main Memory 40, a parity error is detected on a given word, the mini-cache Steering Block 24 will set the "corrupt bit" for that word as it is loaded into the Data Queue $26q$; (ii) the main memory 40, when it has detected an error in a word before the word is transferred on the system bus 22, will set the corrupt bit via the system bus into the Data Queue $26q$.

Referring to FIG. 1, the Invalidation Block 28 will monitor the system bus interface 8 to see if any main memory type operations may be in progress. These main memory operations may be initiated by any system resource module 30 such as another processor in the system, various system input/output modules and so on.

If the system operation is an "invalidation type" of operation, that is to say an operation where data is being written to main memory thus to change old memory data, and if the Invalidation Block detects that the address value held in the Address Register $26_a$ is the same (match) as the address value presented on the system bus 22, then this will constitute a "invalidation condition" occurring. The Invalidation Block then will mark the particular mini-cache address value in $26_a$ as being "invalid". Thus, no more mini-cache "hits" can occur for this particular address until a new address value from the forwarding processor is loaded into the mini-cache $14_i$ on some subsequent memory Read operation.

In FIG. 1, the Maintenance Block 29 represents the final section of the mini-cache $14_i$ and includes a series of flip-flops which are set by the maintenance subsystem 50. This block, being controlled by an external maintenance subsystem 50, is configured for various mini-cache modes of operation. These modes of operation include:

(a1) ENABLED FLIP-FLOP-ON:—The mini-cache $14_i$ is operational when set by Maintenance Block 29. In this condition, a mini-cache hit acts to prevent a system bus operation.

(a2) DISABLED FLIP-FLOP-OFF:—The mini-cache $14_i$ is off-line, and no mini-cache operations occur.

(b1) DATA FLIP-FLOP-ON:—When set "on" in the Maintenance Block 29 by the Maintenance Subsystem 50, the mini-cache allows "Processor Read Data" commands to fill the Data Queue $26_q$ and to generate "Hit" signals.

(b2) DATA FLIP-FLOP-OFF:—When set "off" by Maintenance Subsystem 50, the mini-cache $14_i$ will not respond to "Processor Read Data" commands.

(c1) CODE FLIP-FLOP-ON:—When set "on" by the Maintenance Subsystem 50, the mini-cache $14_i$ permits "Processor Read Code" commands to fill the Data Queue $26_q$ and to generate "Hit" signals.

(c2) CODE FLIP-FLOP-OFF:—When this FF is "off" the mini-cache $14_i$ will not respond to "Processor Read Code" commands.

The DATA flip-flop and the CODE flip-flop can be both set "on" concurrently or can be individually set "on" or "off" separately.

It may be observed that the various components of mini-cache $14_i$ such as the Data Queue $26g$, the Address Register $26a$, the Queue Steering Block 24, are made of "normally required" logic even absent the concept of a mini-cache for present usage. The Data Queue $26_q$ receives, synchronizes and holds data captured from the system bus 22 for the use of the processor 10. The Address Register $26_a$ holds the current operating address and is useful and necessary for processor diagnostics and testing. The Queue Steering Block 24 directs the stored data for transfer to the processor 10. Thus, the mini-cache is virtually provided free of additional hardware costs since most of its logic is generally already resident in one form or another. Additionally, since this logic is primarily implemented in an application specific integrated circuit (ASIC) gate array, there is an abundant supply of design structure generally available at no extra cost.

The mini-cache provides for an "error word marking" function. As the four memory words A, B, C, D are received by the mini-cache $14_i$ on the system bus 22 they are checked for several possible error conditions as follows: (i) Bus parity error; or, (ii) Word corruption error.

The word corruption error will be set by the system memory module 40 indicating that this particular word is corrupted. When either of these error conditions occur on the very first word received (the actual word requested by the processor 10), then system level error recovery procedures will be put into place. However, if an error condition is detected upon any of the "remaining" three words, that is to say the look-ahead words, then no system procedures are enacted but the mini-cache $14_i$ will mark this word as "corrupted" within the Data Queue block $26_q$.

On subsequent "Read" operations, if a word marked as "corrupted" is addressed as a mini-cache hit word, it is not sent back to the processor 10 even though it is a "hit" word. Instead this word is treated as a "miss" condition and thereafter a system memory "Read" is initiated on the bus while the mini-cache address is marked as invalid.

If it is assumed that a system memory "Read" operation (and the necessary system bus protocols) will consume 7 clock times, then the following Table I hereinbelow indicates the possible relative performance improvements for memory access of data to a processor. The left hand column indicates the description of the architectural configuration, the middle column shows the "average" access time for the processor to get a data word while the last column shows the percent improvement over a straight access to data from main memory.

TABLE I

| CONFIGURATION DESCRIPTION | ACCESS TIME AVERAGE TO PROCESSOR | % IMPROVEMENT OVER MAIN MEM |
| --- | --- | --- |
| MAIN MEMORY | 7 CLKS | 0% |
| GENERAL CACHE | 2.2 CLKS | 68% |
| GENERAL CACHE & MINI-CACHE | 1.4 CLKS | 79% |
| MINI-CACHE ONLY | 3.2 CLKS | 53% |

The mini-cache architecture in FIG. 1 of the present system can be used either as an addition to a standard general cache memory structure or alternatively can be used in structures without the standard general cache memory module. Further under appropriate circumstances of the bus control used and with the proper design implementation, the mini-cache architecture may be almost free of added hardware material and costs.

Figure 2A:
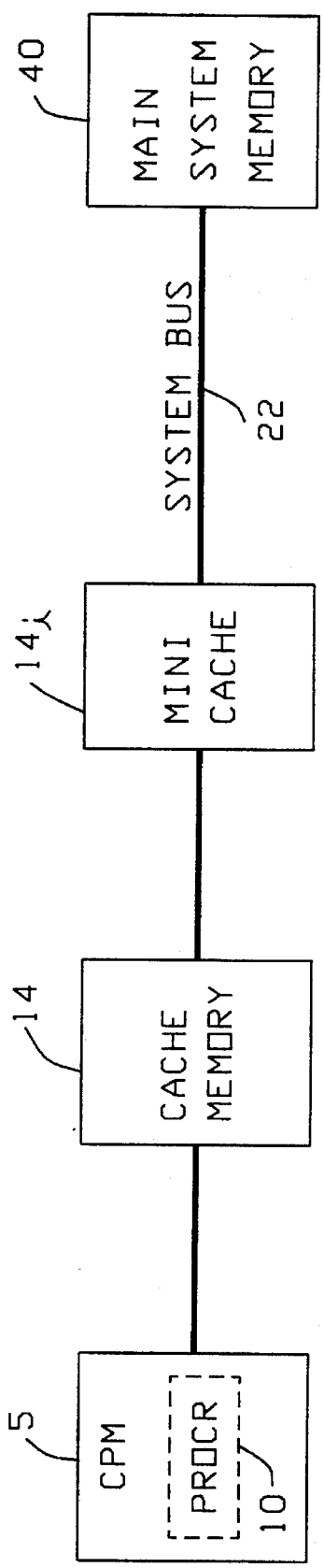
FIG. 2A is a diagram showing the use of the mini-cache with a general cache memory in the system.
Figure 2B:
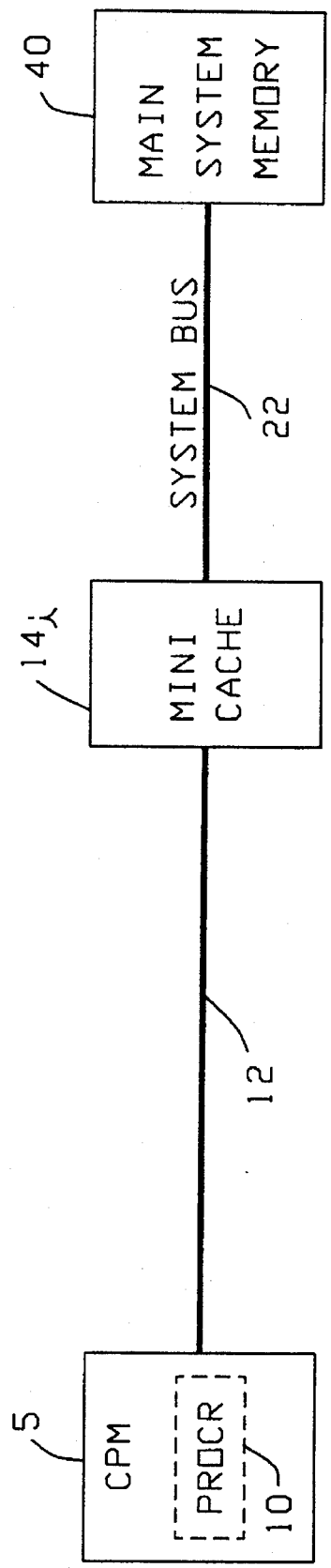
FIG. 2B is a drawing showing the exclusive use of a mini-cache in a computer system without the general cache memory.

FIG. 2B shows a system which exclusively uses only the mini-cache $14_i$ in the system without any general cache memory. Here the processor 10 communicates on an internal bus 12 to the mini-cache $14_i$ and communicates via the system bus 22 to the main system memory 40.

As seen in FIG. 2A, the mini-cache $14_i$ can be used as an enhancement to the general type of cache memory 14 so that the processor 10 will first communicate with the cache memory 14 after which it will communicate with the mini-cache $14_i$ and if neither of these two cache memories can fulfill the processor's data request, then, of course, the processor will use system bus 22 in order to access the main system memory 40.

Like the normal general cache memory, the mini-cache memory $14_i$ can provide to the processor 10 any required memory information without the need for system bus access when the required data is resident in the mini-cache memory. It may be noted that the normal or standard cache memory structures will reduce the memory access time for the processor up to 80 to 90% of the time involved in memory access requests. The addition of the mini-cache $14_i$ will then work on reducing the remaining 10%–20% of the memory access time required. Thus the mini-cache $14_i$ enhances the performance of the standard cache memory 14 additionally by accelerating the "fill time" of the caching operations.

For example in FIG. 2A, since the processor 10 in the central processing module 5 will be processing for several clock times (perhaps 5 clock times on the average) between executing memory accesses, this processing time provides a "window" for filling in the mini-cache $14_i$ behind the back of the processor while it is doing its normal processing functions. Thus the mini-cache can be loaded during this time without interfering with the processor 10.

Also, it may be noted that the system bus shown 22, in FIGS. 2A, 2B, 2C and 5, is shared with other system modules, and it may require several clock times on the average just to request system bus access, then to arbitrate the access to the bus and to be granted control of the bus (bus control). Thus once control of bus resources is gained, it is well to utilize each request for data access in the most efficient manner possible.

Figure 6:
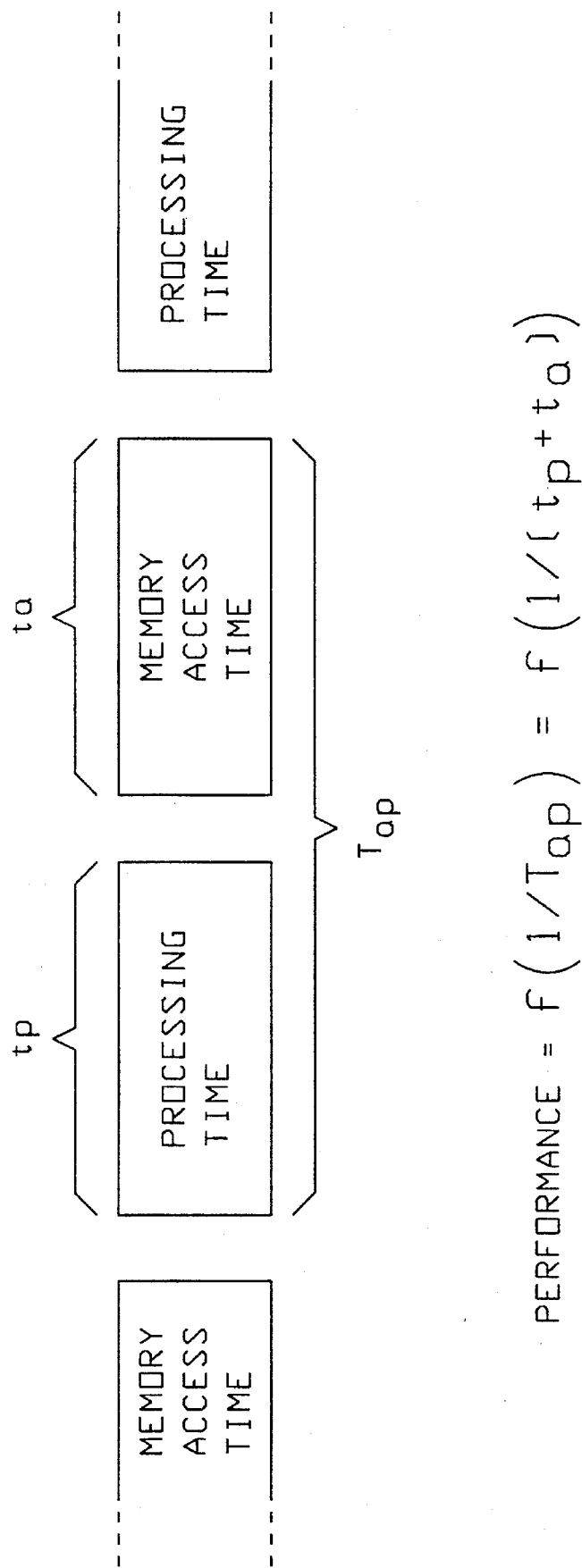
FIG. 6 is a drawing showing the timing factors involved for a processor to access main memory data.

During the processing time, $t_p$, (FIG. 6) and with the mini-cache memory $14_i$ being present and enabled, multiple memory words are accessed each time the system memory operation occurs. The bus protocol in the aforementioned A-11 computer system provides bus operators which will read the specifically requested memory word plus three other words (block of words) around the requested word. These words are provided immediately on the system bus 22 (one word per clock time) after the requested word.

Figure 3A:
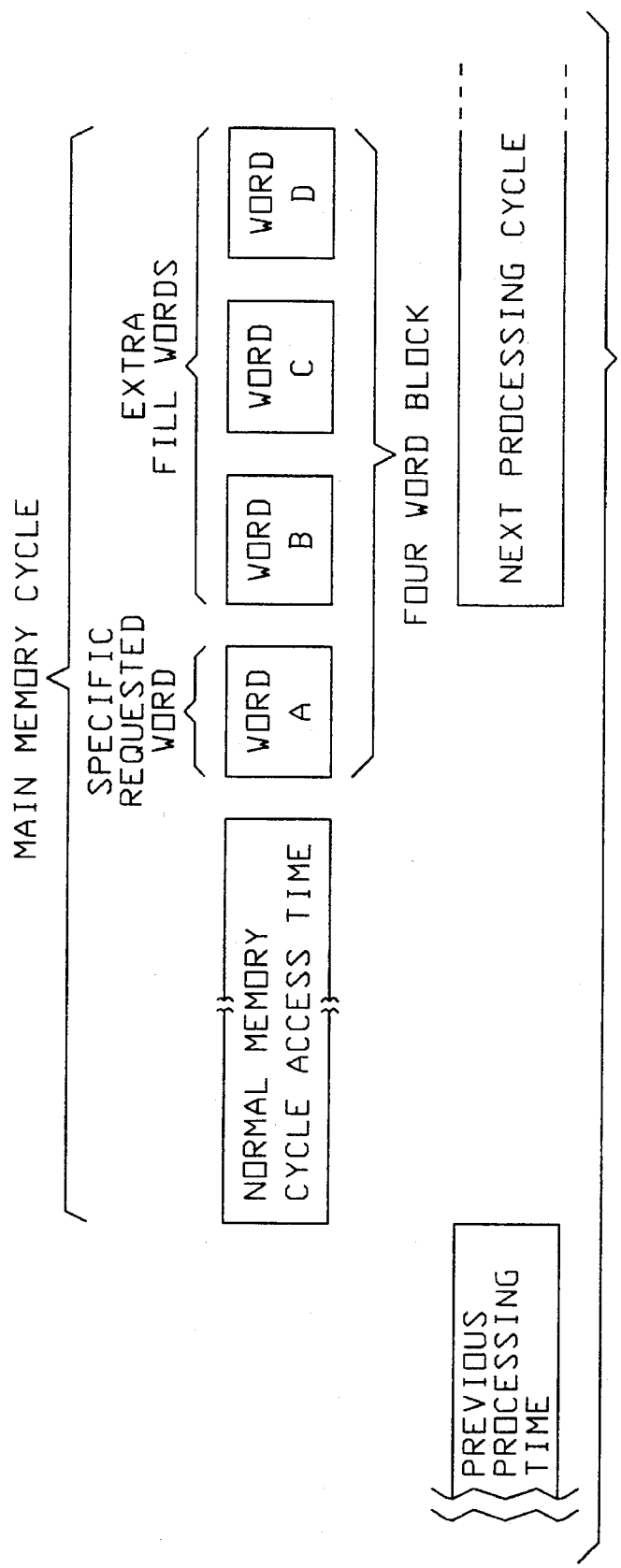
FIG. 3A is a drawing illustrating how a main memory cycle and a four word block is received from main memory.

The Mini-Cache $14_i$ immediately gives the requested word to the processor 10 and then stores the requested word plus the three extra words into the Data Queue $26_q$ of the mini-cache $14_i$. The address for this "block of words" is also held in the Address Register $26_a$ of the mini-cache for future "hit" comparison purposes. FIG. 3A shows the 4-word memory block on the system bus designated as word A, word B, word C, and word D. Whether the processor receives a single word (if the mini-cache $14_i$ is disabled or not present) or the 4-word block is received, the bus protocol in the presently described system requires the same number of clocks, except that there are specifically three additional clock times added to receive the three extra data words. However, these clock times are invisible to the processor 10. The memory block (containing the requested word) is always received with the specifically requested word first in line.

Thus in FIG. 3A it will be seen that during the main memory cycle and after the normal memory cycle access time, (the specific word requested being word A,) then word A is the first received word by the processor 10, but additionally on the next processing cycle, there are three clock times used in order to also receive word B, word C, and word D.

Figure 3B:
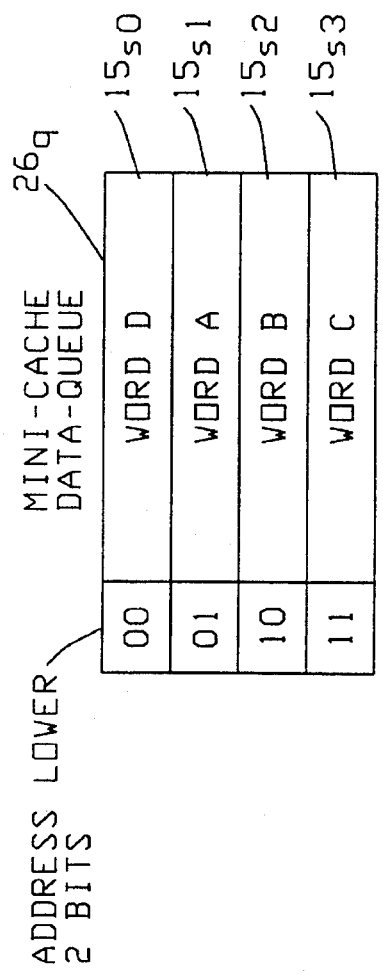
FIG. 3B illustrates the stacking of the four word block in the Data Queue of the mini-cache module.
Figure 4:
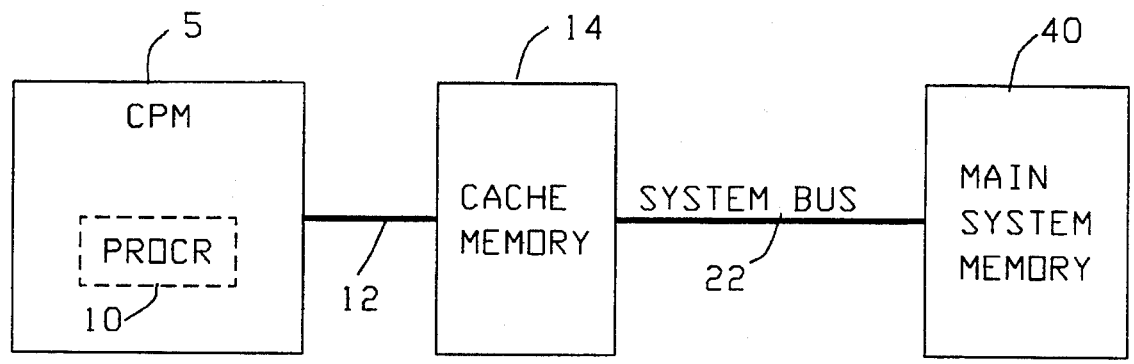
FIG. 4 is a drawing showing a commonly used architecture for a system with processor cache memory and main system memory.
Figure 5:
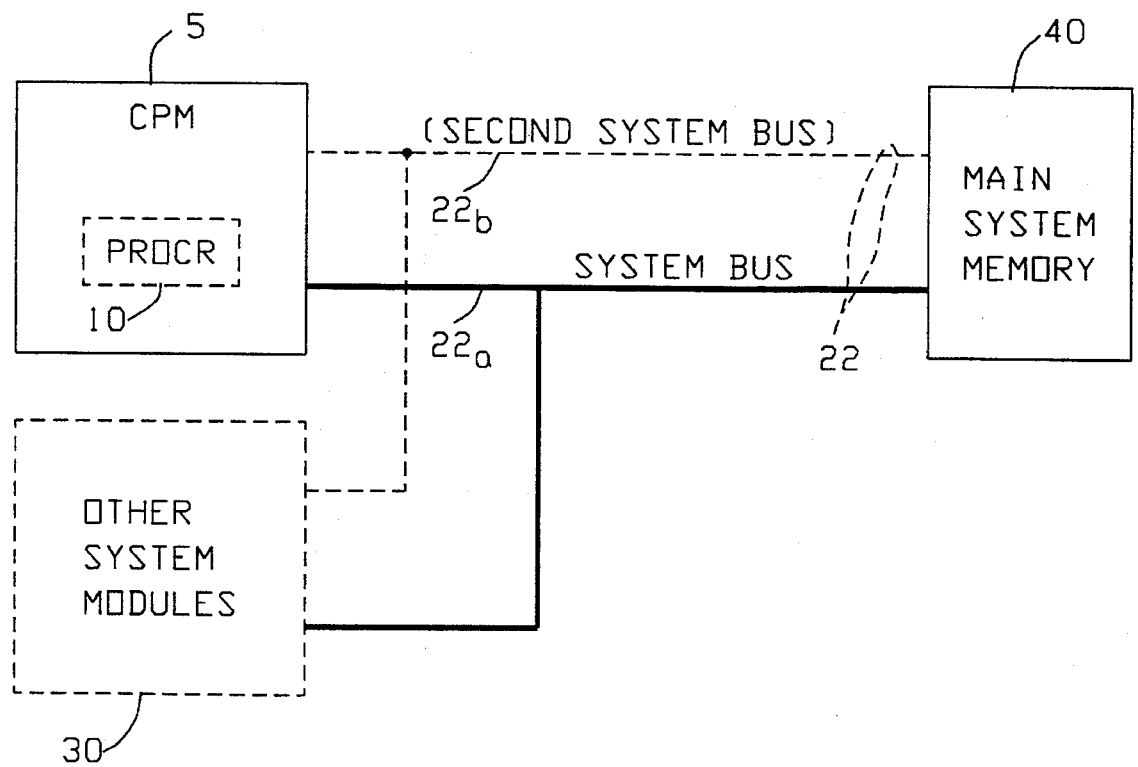
FIG. 5 is a generalized version of a computer system which may use a single bus for data transfer channels or may have a second system bus to provide for dual system bus operation.

As seen in FIG. 3B there are four data registers ($15_{sx}$) designated $15_{s0}$, $15_{s1}$, $15_{s2}$ and $15_{s3}$ which are used to store data words in blocks of four words in the Data Queue $26_q$ (of FIG. 2). Thus the Data Queue $26_q$ is seen in FIG. 3B holding the four word block received from main memory 40 as it is stored within the mini-cache $14_i$. The lower two bits of the address lines control which of the four storage registers (within the mini-cache) into which a word is to be placed and held. Thus if the lower address bits of the requested word are binary "00", then the word is held in the register $15_{s0}$. If the lowest address bits are binary "01", then the word will go to and reside in the register $15_{s1}$, etc.

The processor 10 may have requested a memory word of any value on the lower two bits. This word is received from the main memory 40 first and then transferred to the processor 10 for immediate processing as well as being stored in the appropriate mini-cache register of $14_i$.

The "add-ons" or the following three words which come immediately from the main memory 40 on the following three clocks, will then be a binary count of the lower two address bits.

If, for example, the requested memory word was addressed with the lowest 2 bits as "00", then the return order would be "00", "01", "10" and "11". This is a straight binary Mod 2 Count.

If, however, the requested word was addressed with the lowest two bits being "10", then the return order (to the processor) would be "10", "11", "00", and "01". Again this is a Mod 2 binary count.

These words are then stored in their appropriate Data Queue register $15_{sx}$ in the mini-cache $14_i$.

FIG. 3B shows an example where the original processor "Read" request was word "A" and this is placed at the lower address bits of "01", in the register $15_{s1}$. In this example, the remaining three words from the memory 40 were placed into the mini-cache $14_i$ and placed at the binary address positions "10" (Word B) at register $15_{s2}$, then address bits 11 (Word C) at register $15_{s3}$, and then (Word D) at address bits 00 in register $15_{s0}$.

Once the mini-cache $14_i$ has been filled from main memory 40 with a particular four word block, the block is marked as "valid" and the "address" of the currently stored block is held in the Address Module $26_a$ in the mini-cache for future comparison when requests are made for data. The mini-cache Address Register, $26_a$, FIG. 1, holds all of the address bits for the data block involved except the two lower bits.

On the next and subsequent processor "Read" operations and before a system bus memory operation has begun, the "address requested" by the processor 10 is compared with the block addresses held in the mini-cache Address Register $26_a$. If a true comparison occurs, that is to say, the mini-cache has a "hit", then the particular appropriate word (of the four words held and stored) is transferred immediately to the processor 10 and no system bus operation is begun. System bus request is prevented by a signal on line $27_c$ from the Hit Control Block 27 of FIG. 1 which prevents any system bus request to occur when a "hit" has occurred in the mini-cache $14_i$.

In the situation provided in FIG. 2A where a general cache memory structure is present in addition to the mini-cache structure, then the general cache memory 14 is always the first possible source of data to the processor 10. However, if the general cache memory 14 operates under a "miss" condition, that is to say it does not currently hold the requested memory address, then the mini-cache $14_i$ will be the next possible source of data access for the processor before any request is initiated to the system bus 22 to access the main system memory 40.

Throughout system operations, a memory block of four words is held in the Data Queue $26_q$ within the mini-cache registers $15_{sx}$ along with the block address which resides in the Address Register $26_a$ of FIG. 1. Here the four-word block is marked "valid" until one of two possible actions occur:

(a) a "miss" occurs at the mini-cache $14_i$ for a requested processor memory Read. Under these conditions, a system main memory Read cycle will occur which re-fills the mini-cache $14_i$ with the new data from the new address. The "new" address in $26_a$ is now marked as "Valid". While the mini-cache $14_i$ is being filled with the new data words the requested word is also sent to the processor 10.

(b) An "invalidation type" operation occurs at the address held in the mini-cache Address Register $26_a$.

Referring to FIG. 2C and FIG. 1, indicating the mini-cache $14_i$, the Steering Block 24 will be seen to connect to the general cache 14 and the processor bus interface 8. This interface receives signals from the processor 10 and the general cache memory 14 and will include the following signals:

PROCESSOR REQUEST ADDRESS:—used to compare address on bus with the address in register $26_a$ for possible mini-cache hits;

CMD—VALID:—indicates a valid address from the processor on bus; $24_p$ and $14_p$.

CMD—TYPE—indicates whether a valid Data-Read or a Code-Read; from the processor is on bus $24_p$ and $14_p$.

CACHE-HIT:—indicates that the general cache memory 14 had a hit for this Read Operation.

Communication via bus $28_c$ to the Invalidation Block 28 from the system bus logic in interface 8 includes the following signals:

SA-Address-In:—is the input address on the system bus A (first system bus $22_a$).

A-Check-Address:—the system bus Address is active and has a valid-invalidation type operation.

SB-Address-In:—this is the same as the above signal except it is for the second system Bus $22_b$.

B-Check-Address:—this is the same valid-invalid operation as above but directed toward the second system Bus, $22_b$.

Mini-Cache-Hit:—this is the output on line $27_c$ from the mini-cache $14_i$ to inhibit system bus memory requests. It goes to the system bus controller, in interface 8.

The functional elements of the mini-cache $14_i$ may be summarized as follows:

Address Register Block $26_a$: (i) holds the current valid address blocks in the mini-cache; and, (ii) compares this address value against the incoming address values from the processor. A match or equality causes a mini-cache "hit" signal. This block holds a "VALID" flip-flop (FIG. 2) which when set "on" indicates the block address is valid. It is set "on" when mini-cache $14_i$ has its Data queue filled with a good block from memory 40. This flip-flop can be reset to INVALID by the Invalidation Block 28. It is set as the Data Queue is filled with a new block from Main Memory 40.

Invalidation Block 28: (i) compares the address on the system bus (or busses) for "Write" Operations with addresses residing in the Address Register $26_a$; and, (ii) if an equality or match occurs, this block marks the Address Register $26_a$ as "invalid".

Hit Control Block 27: (i) provides the mini-cache "Hit" signal to a system bus controller in interface 8 to prevent system bus operation which might seek main memory access. The system bus interface 8 provides all the required bus protocols.

Queue Steering Block 24: (i) monitors the processor's Read requests, the general code hits, and the processor addresses; and, (ii) steers the appropriate register's $15_{sx}$ data (on a mini-cache hit signal) to the processor and the general cache memory, 14.

Maintenance Block 29: (i) allows all registers to be loaded (by shifting in) and Read (by shifting out) to the maintenance subsystem 50. Thus the entire mini-cache unit can be tested in this fashion. As seen in FIG. 2, this block connects to all the other block circuitry in the mini-cache $14_i$ to provide for testability and uses flip-flops (settable from the subsystem 50) to set the operational mode.

Figure 7:
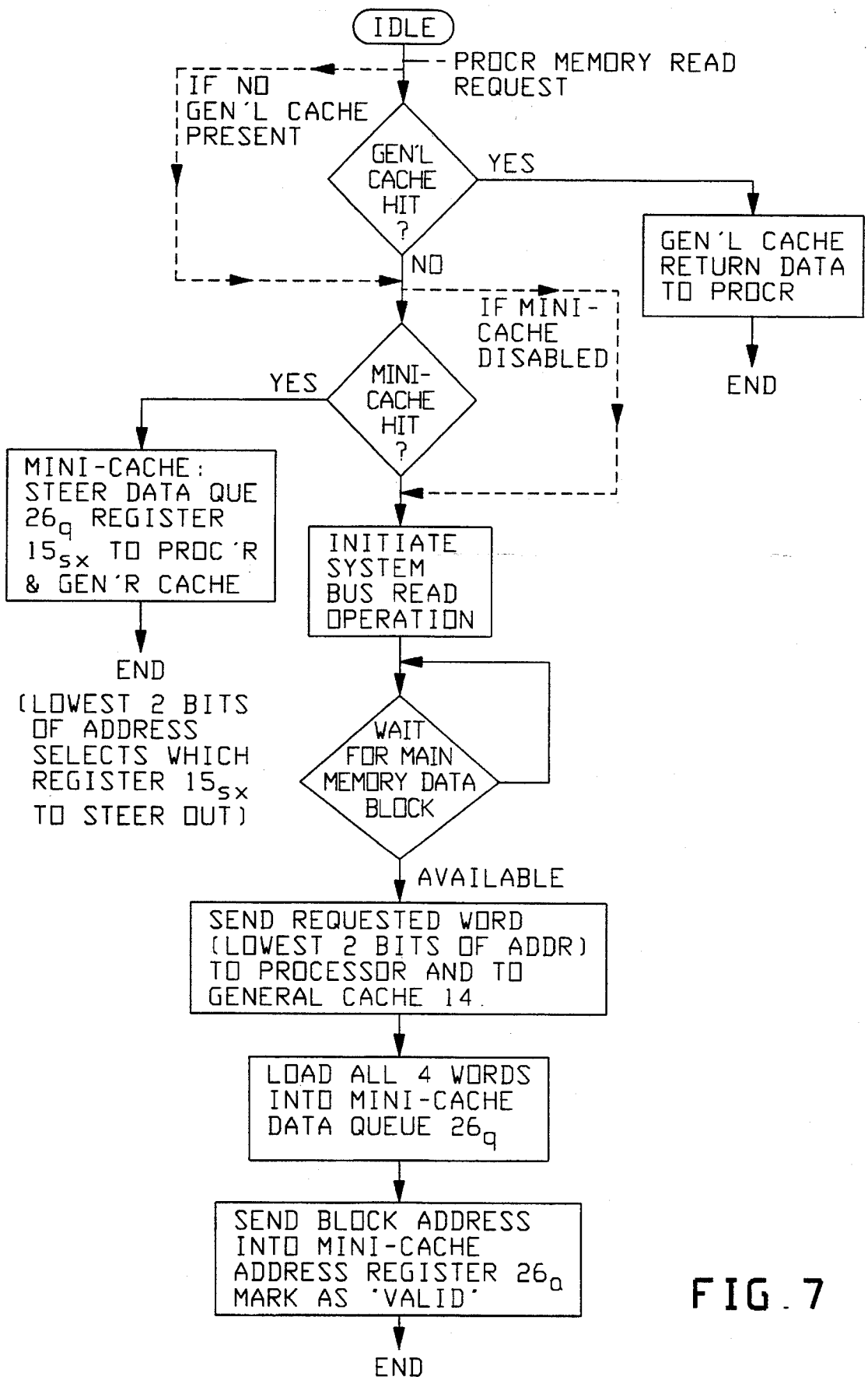
FIG. 7 is a flow chart illustrating the use of a mini-cache module in system operations.

Referring to FIG. 7, there is seen a flow chart illustrating the use of the mini-cache in a computer system operation.

In FIG. 7, starting from the "idle" condition, there occurs a processor memory Read request. A decision is made as to whether there is a general cache hit which, if indicated as "yes", the general cache memory unit 14 will return data to the processor 10 and that cycle will be terminated.

If there is no general cache hit, then the processor memory Read request is directed to the mini-cache $14_i$ to see whether a hit occurs there. If a hit has occurred, then the mini-cache unit $14_i$ will steer data from the appropriate Data Queue $26_q$ and the register $15_{sx}$ to the processor 10 and the general cache unit 14 at which time the Read request cycle will be terminated.

It may be noted that the lowest 2-bits of the address to the mini-cache will determine which register $15_{sx}$ data word will be steered out.

If there is no mini-cache $14_i$ hit, then the system bus controller will initiate a system bus Read operation for the memory request. At this time, there is a wait for access to the main memory data block. When this becomes available the requested word will be sent to the processor 10 and to the general cache unit 14. This word has been residing at the lowest 2-bits of the requested address in the Data Queue block $26_q$.

Subsequently, all four words are loaded into the mini-cache Data Queue $26_q$.

After this, the command block address is fed into the mini-cache Address Register $26_a$ and is marked as "valid" after which the Read request cycle has now been ended.

Described herein has been an auxiliary mini-cache system which can be functional on its own with a processor and main memory or which can be added to a general cache memory in a computer system in order to reduce the access time for processor-retrieval of memory data. The resulting improvement in processor performance enables substantially greater efficiency for computer system operations at very little cost in hardware or processing effort.

While the basic concept of the architecture and usage of the described mini-cache system has been indicated, it should be understood that other implementations and configurations could be possible using the same concept and as defined in the following claims.

What is claimed is:

1. A system wherein a processor having a general cache memory is connected to an auxiliary cache module for enhancing cache storage of said general cache memory to expand the storage capability of frequently used words from main memory and which words have a main memory address, said processor generating commands for reading data words or instruction code words, said system comprising:

(a) said auxiliary cache module including:
      (a1) steering block means for routing the addresses of a block of four words, to an internal address register means and for transferring said block of four words to a data queue means for storage during such time when said processor is executing processing instructions;
      (a2) said data queue means for storing said block of four words from main memory, said words including data words and instruction code words:
      (a3) said internal address register means for holding the said main memory address of each of said block of four words;
      (a4) means to compare a single word requested address from said processor with the addresses stored in said internal address register means and to generate a hit signal if a match occurs, for enabling a word transfer to said processor;
   (b) bus interface means connecting to said main memory via a system bus means including:
      (b1) means for transferring a four-word block of data words or instruction code words to said steering block means;
   (c) internal maintenance means for receiving control signals to configure the storage capability of said general cache memory and said auxiliary cache module so as to enable said auxiliary cache module to expand the storage capacity of said general cache memory, or to disable said auxiliary cache module from expanding the storage capacity of said general cache memory, and including:
      (c1) means to enable said data queue means to respond only to Read data word commands only;
      (c2) means to enable said data queue means to respond only to Read instruction code word commands.

2. The system of claim 1 wherein said steering block means includes:

(a) means to address and select a single requested word from said block of words in said data queue means.

3. The system of claim 1 wherein said data queue means includes:

(a) signal bit register means for each word in said block of words to indicate whether its associated word is invalid or valid.

4. The system of claim 1 wherein said auxiliary cache module includes:

(a) means to sense when an external write operation to a requested selected address in main memory, is in progress, which matches the address in said internal address register means, including:
      (a1) means to signal an invalidation circuit means when said match occurs;
   (b) said invalidation circuit means for setting an invalid signal in said internal address register means, upon occurrence of said matched address signal;
   (c) and wherein said internal address register means includes a flip-flop for indicating the validity/invalidity of said matched address in said internal address register means.

5. The system of claim 4 wherein said means to compare includes:

(a) means to inhibit a request to main memory by said processor upon occurrence of said match signal.

6. The system of claim 1 wherein said steering block means includes:

(a) means for selecting which one word of said block of four words will be transmitted to a requesting processor.

7. In a very large scale integrated circuit chip having predetermined internal logic units and gates which can be controlled externally to reconfigure the said internal logic units and gates, a reconfigurable system having a processor, a general cache and a bus interface unit with an auxiliary mini cache means, said system comprising:

(a) processor means for executing instruction code or data words derived from a main memory means or from instruction code words and data words residing in a general cache means or auxiliary mini cache means;
   (b) general cache means for storing frequently used instruction code words and data words for immediate and quick access by said processor means;
   (c) said bus interface unit for connecting said main memory means to said auxiliary mini cache means and wherein said auxiliary mini cache means is connected to said general cache means for providing supplementary storage for said frequently used instruction code words and data words, said mini cache means including:
      (c1) maintenance circuit means for receiving control signals from an external source, said maintenance circuit means including (i) means to expand cache storage by enablement of said auxiliary cache means to provide extra storage for said general cache means, and (ii) means to disable said auxiliary mini cache means to deny extra storage for said general cache means;
      (c2) means for receiving a four-word block of data or code words during periods of normal processor operations.

8. The system of claim 7 wherein said maintenance circuit means includes:

(a) means to load input test data into said predetermined logic units and gates;
   (b) means to shift out said input test data for test and diagnosis.

* * * * *